INVENTORS:
John P. Segers
Joseph C. Rhodes

United States Patent Office 2,769,336
Patented Nov. 6, 1956

2,769,336
CAPILLARY ASSEMBLIES FOR FLOW MEASUREMENTS

John P. Segers, Crete, and Joseph C. Rhodes, Park Forest, Ill., assignors to Standard Oil Company, Chicago, Ill., a corporation of Indiana Application September 29, 1954, Serial No. 459,148

7 Claims. (Cl. 73—53)

This invention relates to an improvement in capillary apparatus for use in automatically determining volatility and viscosity characteristics of liquids.

It has been proposed that the vapor pressure of liquids be continuously and automatically determined by withdrawing a sample from a source of liquid at a constant rate of flow, preheating the sample and introducing it into a vaporizing chamber within a constant temperature bath. A free surface of liquid is maintained within the vaporizing chamber and the pressure within the chamber is proportional to the vapor pressure of the liquid at the temperature of the constant temperature bath. If the chamber is not vented, the air accumulates and the total pressure in the sample is equal to the air pressure plus the vapor pressure of the liquid giving an unreliable measure of Reid vapor pressure. Therefore, a capillary vent leading from the vaporizing chamber to the atmosphere is provided to continuously bleed off the air.

In the standard Reid vapor bomb test (ASTM D323–42) a certain amount of gasoline vapor is displaced into the unfilled portion of the bomb and in the above system the venting capacity of the capillary is chosen so that the amount of vapor vented with the air is comparable to the amount of vapor displacement in the standard Reid bomb test in addition to being sufficiently large to insure that no foreign gases accumulate in the chamber.

It will be apparent that the characteristics of the vent capillary are very important to the automatic Reid vapor test and it is with respect to the venting capillary means that this invention relates in particular. Furthermore, it is necessary to maintain the capillary in its original calibrated condition.

It is, therefore, an important object of the present invention to provide an improved apparatus for use in automatically and continuously determining vapor pressure of liquids. Another object of the invention is the provision of an improved venting capillary assembly whereby the problems previously encountered in such an apparatus are substantially eliminated. A further object of the invention is the provision of a capillary assembly which may be readily replaced and which has reproducible characteristics. These and other objects of the invention will become apparent as the description thereof proceeds.

A preferred embodiment of our invention will be described in connection with the accompanying drawings wherein.

Figure 1:
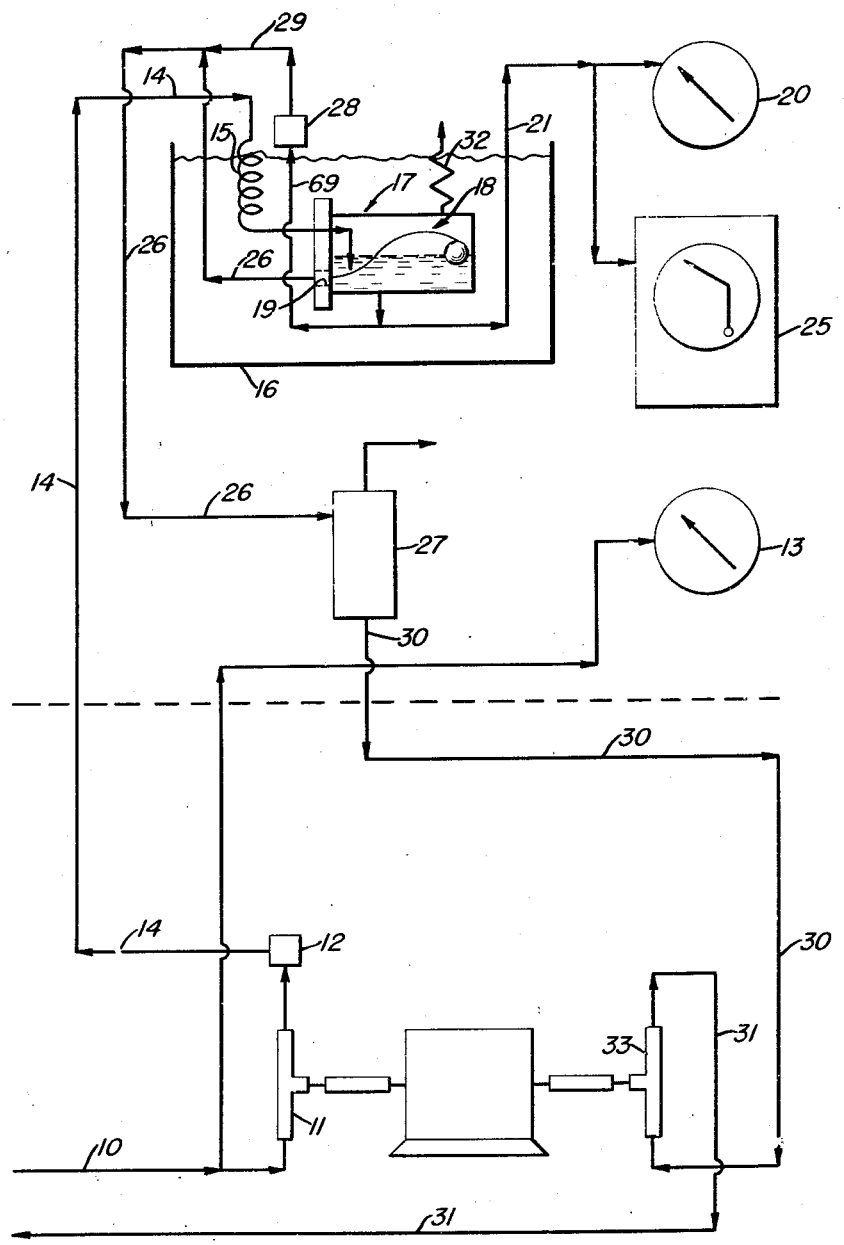
Figure 1 is a diagrammatic representation of an automatic Reid vapor pressure apparatus of the type to which our improvement is directed.

Referring to Figure 1, a gasoline blend is introduced via sample line 10 and pumped at a uniform rate by pump 11 through the check valve 12 and into the vapor pressure apparatus. The sample line 10 is provided with a line pressure gauge 13 and the liquid sample flows via line 14 through preheating coil 15 disposed within constant temperature bath 16. In flowing through the preheating coil 15, the liquid is raised to a temperature which is in substantial equilibrium with the temperature of the oil bath 16.

For gasolines having Reid vapor pressures in the range of six to twenty pounds, the oil bath temperature is maintained in the range of between about 135° and about 145° F., the temperature selected being high enough to insure the vapor pressure of the liquid under test will always be greater than atmospheric. However, it is preferred to use a temperature of about 140° F. since at that temperature the effect of the composition of blends on the pressure within chamber 17 is minimized when vented at a proper rate.

Any means for controlling the bath temperature may be used. However, one means for effecting such control is to provide a constant temperature bath comprising an insulated vessel with a coil heater which is controlled by means of a thermoswitch. The thermoswitch may be connected to a suitable relay where current is supplied to the heater in response to changes in the temperature of the bath as sensed by the thermoswitch.

The preheated sample flows as a liquid from the coil 15 into the vapor chamber 17 in which a constant level of sample liquid is maintained by float valve 18. Excess liquids flow from the chamber 17 by means of the outlet line 26, flow through which is controlled by the float valve 18. A pressure gauge 20 is attached to the chamber 17 via impulse line 21 so as to measure the pressure within chamber 17 and preferably communicates with the liquid zone of the chamber 17. In addition to the gauge 20, a vapor pressure recorder 25 is provided for recording the pressure with time. This recorder 25 may comprise a recorder-controller for controlling a blending valve or line so as to maintain a blended liquid composition which meets the desired Reid vapor pressure specification.

The excess liquid withdrawn from the chamber 17 by line 26 discharges into a vented return line sump 27. A pressure relief valve 28 is connected to a branch of the impulse line 21 (leading to the vapor pressure gauge 20 and recorder 25) and has its discharge side connected by line 29 to the drain line 26. Thus, in the event of any upset, such as a failure of the float valve 18 in the chamber 17, the flow from pump 11 will be released through pressure relief valve 28 and removed from chamber 17 by the return system. In any event, the liquid from the sump 27 is conducted by return pump 33 through line 30 and discharged into return line 31.

Figure 3:
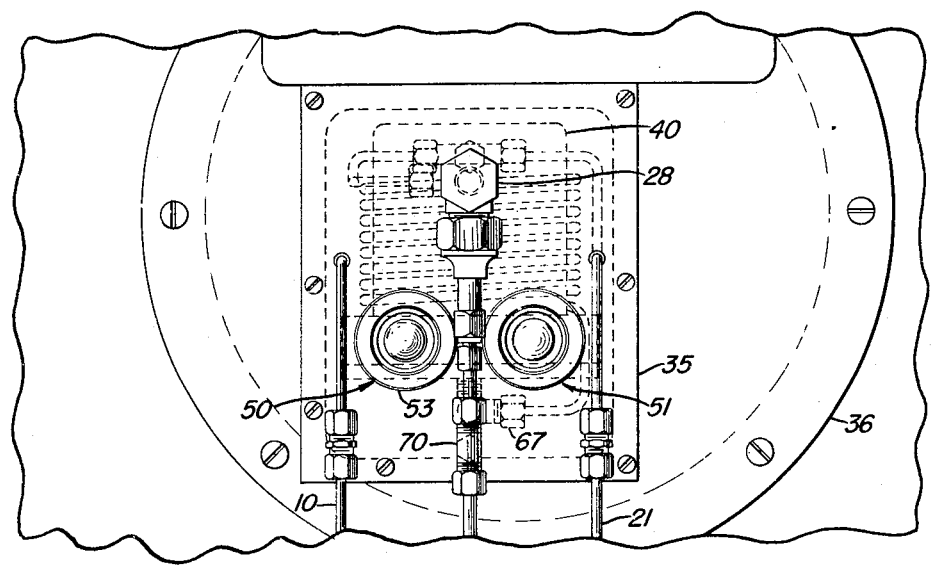
Figure 3 is a top view of the apparatus in Figure 2.
Figure 4:
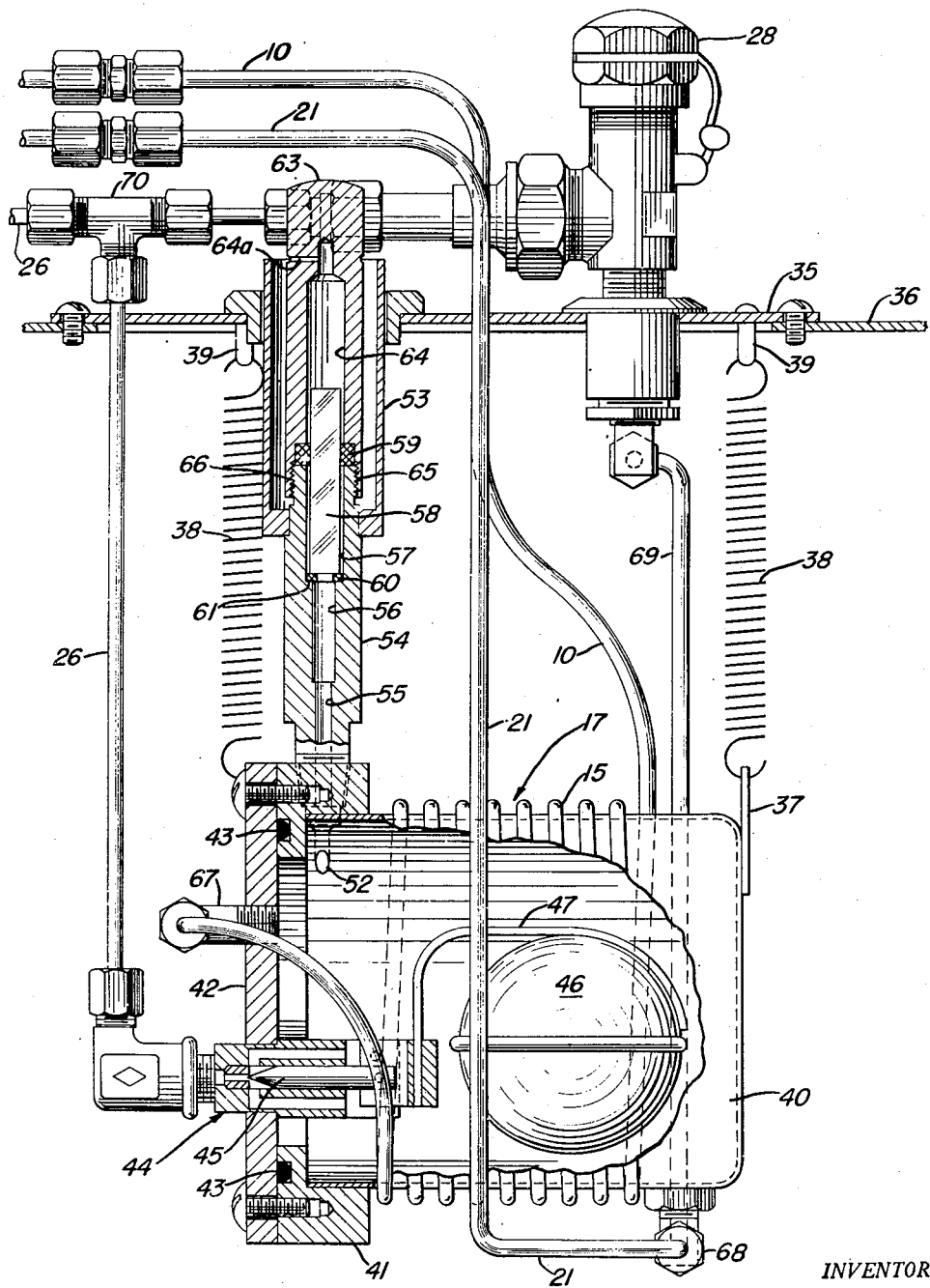
Figure 4 is a side elevation, partly in section, of the apparatus in Figures 2 and 3.

Attached to the upper end of the float chamber 17 is the vent capillary 32 which bleeds vapors and fixed gases from the float chamber 17, the capillary means 32 being immersed in the constant temperature bath 17. Further details of the capillary means 32 and float chamber assembly 17 will now be described by reference to Figures 2, 3 and 4 in the drawings.

The float chamber 17 comprises a horizontally disposed cylindrical cup 40 with a collar 41 fixed about the open end and a float cover plate 42 fixed to the collar 41. An O-ring or other gasket 43 is provided between the collar 41 and the cover plate 42. The float chamber 17 is provided with hangers 37 and support springs 38 which are fixed to spring anchors 39 in support plate 35, which rests on the bath cover 36. It is contemplated, however, that if desired a rigid post depending from the support plate 35 may be used for suspending the float chamber 17 within the bath 16. The liquid level is maintained high in the bath 16 and the float chamber 17 is, therefore, immersed at all times.

A needle valve assembly 44 is mounted in the cover plate 42, the needle 45 of which is pivotally fixed to one end of the float arm 47, the other end of which supports float ball 46.

Figure 2:
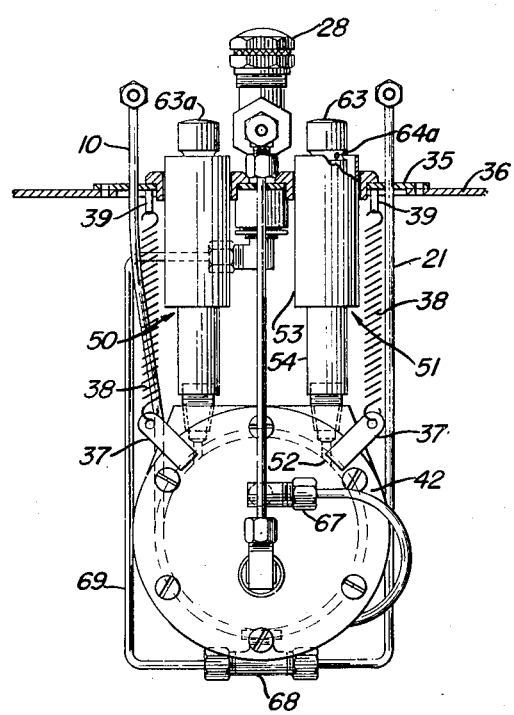
Figure 2 is an elevation of our capillary assembly associated with the float chamber.

A pair of capillary assemblies 50 and 51 (corresponding to the vent capillary 32 shown schematically in Figure 1) are supported on the collar 41, as shown for example in Figure 2; there being connecting bores 52 in the collar 41 which open into the cup 40.

Each capillary assembly 50 and 51 includes a cap well 53 fixed to or integral with the body 54. Within the body 54 is a chamber consisting of bores 55, 56 and 57, the latter bore 57 receiving a portion of the glass capillary 58 which is mounted in flexible fitting or grommet 59. A bumper 60 may be provided on shoulder 61 at the base of bore 57 to support the lower end of the glass capillary 58.

The cap 63 is provided with a bore 64 to receive the upper end of the glass capillary 58 and has internal threads 65 for engagement with the external threads 66 on the upper end of body 54. A shoulder 61 in the cap 63 engages the grommet 59; thus, it will be apparent that upon threading the cap 63 into place on the body 54 the grommet 59 is compressed to effect a tight seal about the capillary 58. The cap 63 is provided with vent 64a which communicates with bore 64 and permits flow through the capillary 58. Capillary assembly 50 is similar to assembly 51 except that the cap 63a is not provided with the vent 64a and is referred to as the "blank" cap.

The capillaries 58 comprise tubular elements which may become plugged resulting in erratic or irregular operation of the vapor pressure apparatus. Accordingly, we provide a pair of identical capillaries 58 within identical capillary assemblies 50 and 51 but do not operate them in parallel during routine operation. Only one of the assemblies is provided with a vented cap 63.

The capillary assemblies 50 and 51 are constructed so as to facilitate the removal and introduction of the capillaries 58. To replace or interchange the capillaries 58, it is merely necessary to remove the appropriate cap 63 or 63a by unscrewing it from the body 54 which permits withdrawal and replacement of the capillary 58.

To test a particular capillary during a period of constant or uniform operation, the caps can be interchanged to ascertain which capillary is defective or plugged. If after switching the caps the pressure reading changes, this is an indication that the capillary 58 which has been in use is defective. In replacing the defective capillary our invention permits replacement without disturbing the installation fittings, the well provided by the sleeve 53 making it unnecessary to dismantle the apparatus.

The capillaries, for use in the determination of vapor pressure of blended gasolines, have an overall length of about 1.5 inches, an internal diameter or cross-section flow area equivalent to a tube having an I. D. of about 0.0055 inch. However, a very satisfactory tubing is thermometer tubing which is non-circular in cross section, the cross section having a major diameter of about 0.008 inch and a minor diameter of about 0.003 inch.

The venting capillary 58 is calibrated by adjusting the length to permit a flow of about 190 cc. of nitrogen per minute at 20° C. with a pressure drop of 35 p. s. i. across it. Such a capillary allows the flow of about 60 cc. of gasoline vapor per minute from 9 pound Reid gasoline at 140° F.

In a typical operation, about 60 cc. per minute of liquid gasoline is introduced into preheater coil 15 which may comprise a stainless steel tube about 8 feet long and about ⅛ inch O. D. (0.085 inch I. D.). Liquid gasoline is continuously withdrawn from the float chamber 17 by way of the valve 18 at a rate of approximately 60 cc. of liquid per minute. Thus, the capillary 32 vents about 60 cc. of gases and air per minute. The amount of stripping resulting from the venting of vapors is reduced and is at a controlled and uniform rate to give a pressure recording which is characteristic of the gasoline blend under test.

The preheat coil 15 shown schematically in Figure 1 is wrapped around the float chamber 17 and discharges through the fitting 67 which is threaded into the cover plate 42. The excess liquid is released by the float valve assembly 17 into drain line 26 as described in connection with Figure 1. The impulse line 21 is connected to a T-fitting 68 in the base of the float chamber 17. A branch line 69 is connected from the T-fitting 68 to the pressure relief valve 28, the discharge portion of which is connected to T-fitting 70 where any fluids are introduced into the drain line 26.

Although we have described our invention with reference to a preferred embodiment thereof, it should be understood that this is by way of illustration only. In any event, modifications in the apparatus and in the techniques will become apparent to those skilled in the art and can be made without departing from the spirit and scope of the invention.

What we claim is:

1. An improved capillary assembly adapted for use in making flow measurements while maintained within a controlled temperature bath which comprises an elongated body externally threaded at both ends, an elongated internally threaded cap disposed about the upper threaded end of said elongated body, a well fixed to the upper end of said elongated body below the point of engagement by said elongated cap and extending axially upward of said body to surround said cap in spaced relation, said cap having a portion extending beyond the open end of said well thereby the cap may be removed from said body without withdrawing the assembly from the controlled temperature bath, channel means extending through said body and through said cap, resilient grommet means interposed said cap and the upper end of said body, a capillary mounted in said grommet and extending axially thereof into said channel means, and a vent duct in said cap above the upper end of said capillary means providing free flow from said channel means to the atmosphere.

2. A replaceable capillary assembly adapted for immersion within a liquid bath comprising in combination an elongated body portion, an elongated cap removably fixed to said body portion, a channel means extending through said body and through said cap, a sleeve fixed to the exterior of said body below said cap and extending about said cap in peripheral spaced relation to prevent liquid intrusion to the said body upon removal of the cap, a capillary supported axially of said body and cap in said channel, and a removable grommet between said cap and said body supporting said capillary.

3. A capillary assembly adapted for use in making flow measurements while maintained within a controlled temperature bath which comprises an elongated body, a flow chamber through said body, an elongated cap adapted to be threaded about one end of said body, a chamber within said cap in substantial alignment with the said flow chamber in said body, said chambers being of substantially equal diameter at adjacent end portions thereof, a flexible annular grommet interposed said cap and said body, said grommet having an internal diameter which is substantially smaller than the diameter of said aligned chambers, a glass capillary secured by said grommet in said chambers, and a vent in said cap.

4. The capillary assembly of claim 3 which includes a well fixed about the upper end of said body and extending upwardly thereof but terminating below the top of the elongated cap, whereby the cap can be removed from the body to expose the glass capillary without intrusion of liquid into the capillary.

5. In a vapor pressure determining apparatus of the type wherein a preheated stream of liquid is passed through a substantially closed chamber and where the pressure above the liquid in the chamber is determined as an indication of vapor pressure of the liquid, the improvement which comprises a capillary vent assembly adapted to be connected to said chamber above the liquid level therein and which comprises a generally cylindrical body adapted to be threaded at its lower end to a bore in communication with said chamber, a flow duct means extending centrally of said body, a sleeve extending from an upper portion of said body, said sleeve being of substantially greater diameter than the outer diameter of said body and providing a fluid-tight well axially of said body, an elongated cap within said well and threaded to the upper end of said body, said cap being provided with an elongated chamber in substantial alignment with the duct in said body, a vent in the upper end of said cap communicating with said elongated chamber, a flexible grommet disposed between said cap and the upper end of said body, and a glass capillary supported by said grommet with one end in said chamber and the other end extending into said duct.

6. In a vapor pressure determining device of the type comprising a vapor chamber, means for introducing liquid to said vapor chamber, means for maintaining a free surface of liquid in said chamber, capillary vent means for said chamber, and a pressure-sensitive means communicating with said chamber, the improvement which comprises a pair of substantially identical capillary assemblies each consisting essentially of an elongated body, an elongated cap threaded to one end of said elongated body, a sleeve fixed to the said one end of said elongated body and surrounding said cap in spaced relation to provide a concentric shield about said cap, a channel extending through said body and into said cap, a capillary mounted within said channel, and one of said caps being provided with a vent duct communicating between said channel and the atmosphere.

7. A capillary assembly adapted for use in a liquid bath and having a removable capillary means therein which comprises in combination an elongated body portion, a channel means in said body, said channel means including an axial chamber, a threaded elongated cap on said body portion, a second channel means in said cap, said second channel means including a second axial chamber in alignment with first axial chamber, a calibrated capillary tube removably fixed within said aligned axial chambers, and liquid shield means fixed to said body and extending axially thereof about said cap whereby said cap and capillary tube can be removed from said body without intrusion of liquid while the assembly is immersed in such bath.

References Cited in the file of this patent
UNITED STATES PATENTS

| | | |
|---|---|---|
| 597,903 | Graham | Jan. 25, 1898 |
| 2,330,564 | Dyer | Sept. 28, 1943 |
| 2,331,284 | Abertine | Oct. 12, 1943 |